Oct. 24, 1933.   S. F. MYERS ET AL   1,931,932
ARTIFICIAL BAIT
Filed Oct. 29, 1932

Inventors
Stanley F. Myers
Adolph A. Kunz
By Frank H. Schwartz
Attorney

Patented Oct. 24, 1933

1,931,932

UNITED STATES PATENT OFFICE 1,931,932

ARTIFICIAL BAIT

Stanley F. Myers and Adolph A. Kunz, Springfield, Mo.

Application October 29, 1932. Serial No. 640,321

7 Claims. (Cl. 43—47)

This invention relates to fishing tackle, and more particularly to artificial bait or minnows.

One object of this invention is to provide an artificial bait of maximum attractiveness to fish.

Another object is to provide an artificial bait having a minimum tendency to catch on weeds and rocks.

Another object is to provide an artificial bait of simple, rugged construction.

The above and other objects and advantages will appear from the following description, appended claims and accompanying drawing forming a part of this specification and in which drawing:

Figure 1:
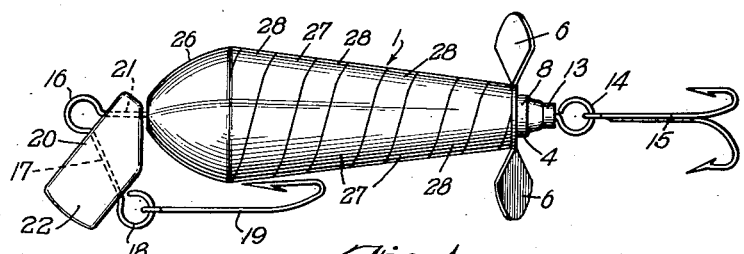
Fig. 1 is a side elevation of the artificial bait with the parts in the approximate positions they occupy while the artificial bait is being drawn through water.

In the particular embodiments of the invention which are illustrated in the drawing, 1 is a bait body of wood or other suitable material having a longitudinal bore 2 in the front end of which a bushing 3 of brass or other suitable material is secured in any suitable way, as for example, by a drive fit. In the rear end of the bore 2 a bushing 4 of brass or other suitable material is secured in any suitable way, as for example, by providing the bushing 4 with right-hand screw-threads 5 by means of which the bushing 4 is screwed tightly into place.

A spinner 6 of usual two-bladed-propeller form has a central annular hole of suitable size to permit the spinner being forced tightly onto the shank 7 of the bushing 4 and against the enlarged annular flange 8 of said bushing 4.

The bushings 3 and 4 are provided with annular bores 9 and 10 respectively, through which extends a shaft portion 11 of a supporting rod 12, with the bait body 1 and bushings 3 and 4 freely rotatable on the shaft portion 11.

The rear end of the supporting rod 12 may extend loosely through a spacing ring 13 and be provided with hook attaching means, as for example, by bending the end of the supporting rod 12 to form an eye 14 to hold a suitable fish hook, such for example as the triple fish hook 15.

The front end of the supporting rod 12 may be provided with traction or draft means by bending the same to provide the traction or draft eye 16 for attachment to a fish line for the purpose of drawing the artificial bait through water to lure fish. When the artificial bait is drawn through water by a line attached to the traction eye 16, the bait occupies the position shown in Fig. 1 with the longitudinal axis of the bait-body 1 and the shaft portion 11 (Fig. 2) of the supporting shaft 12 extending in the general direction of travel of the bait body through the water, and the bait body is caused to rotate by the spinner 6 which is rigid therewith.

In the particular construction illustrated in the drawing, extending from the traction eye 16 is a transversely extending portion 17 having its end bent to form a hook attaching eye 18 to hold a hook 19.

Figure 2:
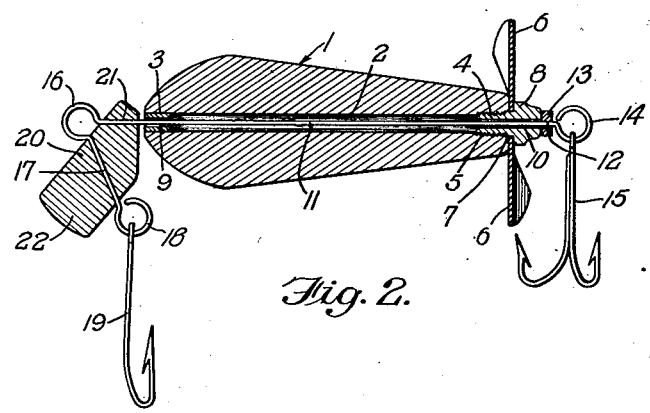
Fig. 2 is a longitudinal sectional view of Fig. 1 with the fish-hooks hanging down in the positions they occupy when the artificial bait is not being drawn through the water.
Figure 3:
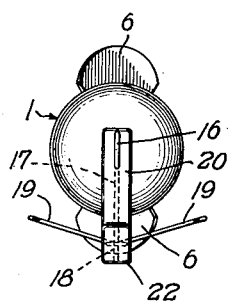
Fig. 3 is a left end elevation of Fig. 1.
Figure 4:
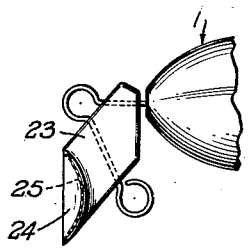
Fig. 4 is a side elevation of the left or front end of the bait body with a modified form of sinker shown therewith.
Figure 5:
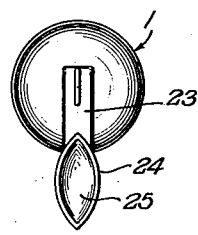
Fig. 5 is a left end elevation of Fig. 4.

Hook 19 is preferably a double hook as shown, with the two hooks of the double hook extending oppositely and somewhat upwardly as shown in Fig. 3 when the hooks occupies the position shown in Figs. 1 and 3 while being drawn through water. Thus there is no hook member beneath the bait body 1 having a hook point pointing downwardly away from the bait body, thus minimizing the tendency of the artificial bait to catch on weeds or rocks.

A sinker 20 of lead or other suitable material is preferably cast in place so as to embrace the portion 21 of the front end of the supporting rod 12 and the transversely extending portion 17 thus providing a simple, easily made construction by which the portion 17 and eye 18 are held rigid with the portion 21, while at the same time acting to support the sinker 20 in proper position to provide a normally downward depending portion 22 which acts to normally hold the double hook 19 beneath the bait body 1 while being drawn through water. The sinker 20 also acts to properly sink the artificial bait beneath the surface of the water.

In addition to the foregoing, the sinker 20 by its position at the front of the bait body 1 gives the impression that the minnow which is simulated by the artificial bait is carrying something in its mouth. This further increases the fish-luring characteristics of the artificial bait embodying this invention.

To still further increase the fish-luring quality of the invention, the sinker may be made of a modified form. Thus the front face of the sinker may be flattened, for example, thus producing a tendency for the sinker to impart an irregular or wabbling motion to the artificial bait. A suitable form of sinker for producing this wabbling motion is illustrated by the modified form of sinker 23 having a widened front face 24 which may, for example, be concaved or dish-shaped as shown at 25.

The bait body 1 may be provided with any desired color combination. In Fig. 1, for example, the part 26 may be red, the wide spiral stripe 27 may be orange and the narrow spiral stripe 28 may be green.

The invention may be embodied in other specific forms without departing from the essential characteristics of the invention, and the present embodiment is therefore to be considered in all respects as illustrative and not restrictive, the scope of the invention being indicated by the appended claims rather than by the foregoing description, and all changes which come within the range of equivalency of the claims are therefore intended to be embraced therein.

We claim:

1. An artificial bait comprising in combination, a supporting rod, a bait body rotatably mounted on the supporting rod and having front and rear ends and adapted to be drawn through water in the general direction of its axis of rotation, a sinker connected to the supporting rod at the front end of the bait body and having a portion normally depending downwardly and forwardly below the axis of rotation of the bait body while the bait body is being drawn through water, and hook attaching means.

2. An artificial bait comprising in combination, a supporting rod, a bait body rotatably mounted on the supporting rod and having front and rear ends and adapted to be drawn through water in the general direction of its axis of rotation, a sinker connected to the supporting rod at the front end of the bait body and having a portion normally depending downwardly and forwardly below the axis of rotation of the bait body while the bait body is being drawn through water, and hook attaching means connected at the sinker.

3. An artificial bait comprising in combination, a supporting rod, the front end of which has a transversely extending portion a bait body rotatably mounted on the supporting rod and having front and rear ends and adapted to be drawn through water in the general direction of its axis of rotation, a sinker connecting the front end and transversely extending portion of the supporting rod and having a portion normally depending downwardly and forwardly below the axis or rotation of the bait body while the bait body is being drawn through water, and hook attaching means.

4. An artificial bait comprising in combination, a supporting rod, a bait body rotatably mounted on the supporting rod and having front and rear ends and adapted to be drawn through water in the general direction of its axis of rotation, a sinker connected to the supporting rod at the front end of the bait body and having a portion normally depending downwardly and forwardly below the axis of rotation of the bait body while the bait body is being drawn through water, and hook attaching means connected at the depending portion of the sinker.

5. An artificial bait comprising in combination, a supporting rod having a shaft portion designed to rotatably support a bait body and having front and rear ends, a traction eye formed on said front end and having an end extended to form a transversely extending portion provided with a hook attaching eye, and a sinker connecting said front end and the part of said transversely extending portion between said eyes.

6. An artificial bait comprising in combination, a supporting rod, a bait body rotatably mounted on the supporting rod and having front and rear ends and adapted to be drawn through water in the general direction of its axis of rotation, a sinker connected to the supporting rod at the front end of the bait body and having a portion normally depending downwardly and forwardly below the axis of rotation of the bait body while the bait body is being drawn through water and having a broad front face at its lower front portion, and hook attaching means.

7. An artificial bait comprising in combination, a supporting rod, a bait body rotatably mounted on the supporting rod and having front and rear ends and adapted to be drawn through water in the general direction of its axis of rotation, a sinker connected to the supporting rod at the front end of the bait body and having a portion normally depending downwardly and forwardly below the axis of rotation of the bait body while the bait body is being drawn through water and having a concave front face at its lower front portion, and hook attaching means.

STANLEY F. MYERS.
ADOLPH A. KUNZ.